June 2, 1964 W. E. HERRMANN 3,135,202
CONTROL MEANS FOR ANNULAR WING AIRCRAFT
Filed Nov. 18, 1959
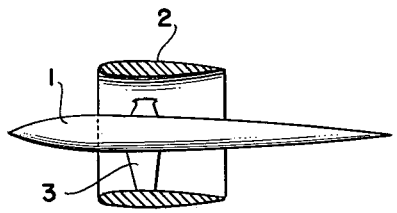
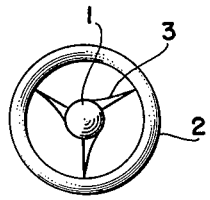
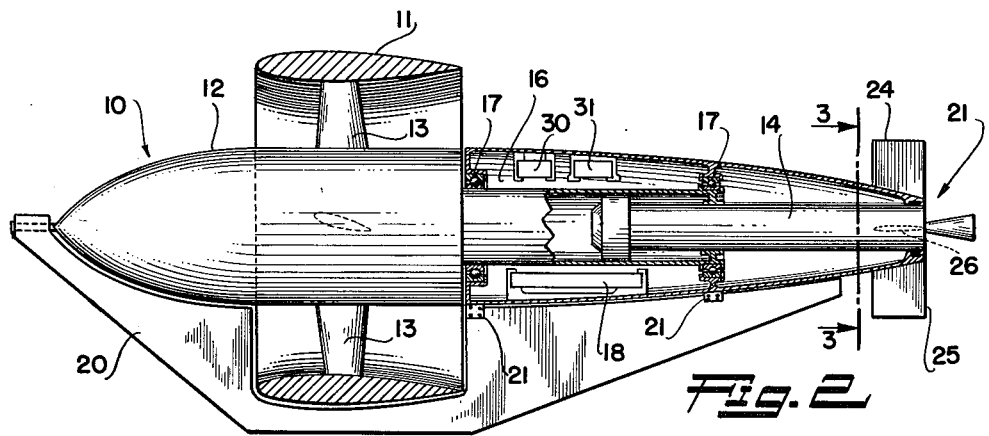
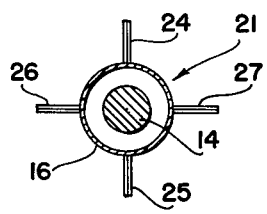
INVENTOR.
WERNER E. HERRMANN
BY
Agent

United States Patent Office 3,135,202
Patented June 2, 1964

3,135,202
CONTROL MEANS FOR ANNULAR WING AIRCRAFT
Werner E. Herrmann, Northridge, Calif., assignor to Lockheed Aircraft Corporation, Burbank, Calif.
Filed Nov. 18, 1959, Ser. No. 853,834
2 Claims. (Cl. 102—50)

The present invention relates to an aircraft, more particularly to an aircraft utilizing a spinning annular wing for purposes of lift and stability. Even more particularly, it relates to a control system for an annular wing aircraft which utilizes the effect of precession of the spinning wing to alter its attitude and heading.

The simplicity and stability of the spinning annular wing aircraft is known to be old in the art as is evidenced by my German Patent Number 726,969 dated September 17, 1942. An annular wing airframe stays at a constant attitude in spaced and follows a straight line flight depending on its release attitude. For short range flights, it is generally not necessary to correct for deviations from the scheduled flight path. For longer range flights, however, where deviations from scheduled flight path may result in large errors from the destination of the flight, some control means are necessary to correct the aircraft back to the original flight path. Some means are also necessary where it is desired to intentionally change the flight path. To date, efforts in this direction have involved the conventional aircraft control systems using a gyro as a reference, much like a conventional autopilot. However, the complicated systems which center around a reference gyro reduce the advantages of the spinning airframe for stability and simplicity.

It is therefore an important object of the present invention to provide an annular wing aircraft and a control system for said annular wing aircraft.

It is further an object of this invention to provide a spinning annular wing aircraft which utilizes the effect of precession of the spinning annular wing for attitude control by applying a moment to the spin axis to control attitude and course.

It is further an object of this invention to provide an annular wing aircraft control system which utilizes a simplified vertical reference.

FIG. 1 shows a general form of the original annular wing as originally conceived by me in German Patent 726,969.

FIG. 1a is a frontal view of the annular wing of FIG. 1.

FIG. 2 shows the aircraft according to the present invention with the front end toward the left.

FIG. 3 is a cross section view taken on lines 3—3 of FIG. 2.

The spinning annular wing combines lift with inherent stability in a very simple airframe. The upper and lower sections of the rotating annular wing provide the necessary lift and its spinning with the central body stabilizes the airframe by the gyroscopic effect.

The aerodynamic characteristics of the annular wing configurations are such that the shift of the center of pressure is very small at varying angles of attack and at changing speed. The center of gravity is at the same or very close to the location of the center of pressure, thus obtaining neutral aerodynamic stability. To keep the precessing of the rotating configuration small, the rotating part is designed for maximum polar moment of inertia and for a high spin rate. Thus, the airframe stays at a constant attitude in space and follows a straight line flight path depending on its release attitude.

To provide attitude and directional control, the present invention utilizes the effect of precession of the rotating annular wing to control pitch attitude and course by applying a moment to the spin axis. The moment that is applied is in a plane 90 degrees to the desired precession plane. To obtain precession in a pitch plane, a lateral moment must be applied. This moment at the spin axis can be caused by a thrust vector or aerodynamic control surface in front or behind the center of gravity of the aircraft. To control the spinning annular wing in the ground-fixed coordinate system, that is, attitude and course, the control moment applied to the spin axis has to be referenced to a plane of the ground-fixed coordinate system. The usual way is to use a gyroscope as a reference as in the conventional autopilot. However, use of such a complicated system would jeopardize the advantages of the spinning annular wing configuration. The present invention retains the advantages of simplicity of the spinning annular wing and utilizes the gyroscopic effect to control its attitude and course.

FIGS. 1 and 1a show an early form of the spinning annular wing as disclosed in my German Patent Number 726,969. The wing 2 is rigidly fixed to the longitudinal body 1 by canted vanes 3. When released at high speed, the vanes 3 will cause and maintain rotation of the wing 2 and body 1, resulting in gyroscopic stability. The simplicity of the annular wing configuration is apparent.

FIG. 2 shows the general arrangement of the annular wing aircraft 10 according to the present invention. The annular wing 11 is fixed to the main body 12 by means of canted vanes 13 so that they will rotate together. Fixed to the aft end of the body 12 is a rocket engine 14. Pendulum body 16 is rotatably mounted on engine 14 by means of low friction bearings 17. The body 16 is retained in its vertical position with respect to the plane of earth's gravity by the pendulum weight 18 which places the center of gravity of the body 16 below the central axis of the aircraft as defined by the rocket engine 14 as can clearly be seen in FIG. 2.

Under normal straight and lever flight conditions, there is no lateral acceleration and the pendulum body will adjust itself to the direction of earth's gravity, that is, vertically. The pendulum body is thus oriented to the horizon. In a turn, however, the lateral forces on the pendulum body will tend to erect it to the resultant of the normal acceleration and that of the lateral acceleration. Thus, it would give an erroneous reference in a turn. To overcome this difficulty, the fin 20 fixed to the lower side of the pendulum body 16 at points 21 is utilized to counteract the tendency of the pendulum to erect itself. By constructing the fin 20 so that its lateral coefficient of lift times its area times the distance of its center of pressure from the axis of rotation as defined by the rockets motor 14 is equal to the weight of the pendulum body 18 times the distance of its center of gravity from the central axis, it can be seen that the two moments will cancel each other and the pendulum body 16 will remain vertically during turns. In order that the aerodynamic surfaces defined by wing 11 and the fin 20 not cause unwanted skewing effect during lateral acceleration, the fin is designed to have the same lateral coefficient of lift slope as that of the annular wing.

To utilize the effect of precession of the spinning annular wing to control the attitude and course of the aircraft herein disclosed, a moment is applied at the aft end of the spin axis of the aircraft at 90 degrees to the desired change of either attitude or course. In FIGS. 2 and 3, this is shown as the control unit 21 on the rear end. Control unit 21 is comprised of vertical surfaces 24 and 25 and horizontal surfaces 26 and 27. The control unit 21 is fixed to the pendulum body 16. The surfaces 24 through 27 are oscillatable about their respective vertical and horizontal axes to apply control forces normal to the aft end of the central axis of the aircraft to cause precession. By deflecting the vertical surfaces 24 and 25, a moment will be applied on a horizontal plane to the aft end of the central axis which will cause precession in a vertical plane, that is, a change in pitch. Deflecting of the horizontal control surfaces 26 and 27 will cause a precession in the horizontal plane. Return of the control surfaces to their neutral position will cause the precession to cease immediately.

It will be noted that the airframe stabilized by this control system will show no pitch or yaw oscillation following a command given or taken out as usually is experienced on conventional wing configurations. The spinning airframe will precess at a constant rate as long as a constant control moment is applied and will stop instantaneously when the moment is removed.

The control surfaces 24 and 25 or 26 and 27 may be operated by means of simple on-off solenoids which are controllable either from sensing means aboard the annular wing aircraft or from ground guidance systems, such as remote radio control. Examples of aircraft carried sensing devices are shown diagramatically as altitude sensor 30 and course sensor 31. The altitude sensor 30 may utilize simple signals from a static pressure probe, not shown here, to cause an on-off control of solenoid means to cause the control surfaces 24 and 25 to deflect in the proper direction to cause a change in pitch up or down through precession. The directional sensor 31 may utilize deviations as sensed from a preselected celestial body to control the solenoid which will alter the position of the horizontal control surfaces 26 and 27. A desired altitude and course may be preset into the sensors 30 and 31.

A spinning annular wing aircraft has been disclosed and a control system which utilizes the effect of the precession effect of the spinning annular wing, thereby retaining the advantages of simplicity of this type of aircraft at the same time requiring positive control.

It is to be understood that certain alterations, modifications and substitutions may be made to the instant disdisclosure without departing from the spirit and scope of the invention as defined in the appended claims.

What is claimed is:

1. An aircraft having a central axis and a main body, canted vanes extending radially from said main body and an annular wing mounted on said vanes having its axis coincidental with said central axis, a pendulum body mounted for relative rotation with said main body about said central axis, said pendulum body having its center of gravity below said central axis, a vertical fin on said pendulum body for maintaining said pendulum body vertical during all phases of flight, vertical control surfaces on said pendulum body movable about an axis vertical to said central axis, horizontal control surfaces on said pendulum body movable about a horizontal axis perpendicular to the central axis of said aircraft and means to cause movement of said control surfaces about said vertical and horizontal axes in response to deviations from altitude and course.

2. An aircraft having a central axis and a main body, canted vanes extending radially from said main body, an annular wing mounted on said vanes having its axis coincidental with said central axis, a pendulum body mounted for relative rotation with said main body about said central axis, said pendulum body having its center of gravity below the central axis, a vertical control surface above said pendulum body, a vertical control surface below said pendulum body having a total area larger than said vertical surface above said pendulum body, equal areas of said vertical control surfaces above and below said pendulum body being movable unitarily about a vertical axis, horizontal control surfaces on said pendulum body movable about a horizontal axis perpendicular to said central axis of said aircraft, means to preselect a desired altitude and desired course, means to sense deviations from said desired altitude and desired course, means responsive to deviations in altitude to cause movement of said equal area vertical control surfaces about the vertical axis and means responsive to deviations from said course to cause movement of said horizontal control surfaces about the horizontal perpendicular axis.

References Cited in the file of this patent

UNITED STATES PATENTS 2,874,920     Mallinckrodt _____ Feb. 24, 1959

FOREIGN PATENTS 726,969     Germany _____ Sept. 17, 1942